No. 737,842. PATENTED SEPT. 1, 1903.
W. A. HOUTS.
BRICK MAKING MACHINE.
APPLICATION FILED OCT. 13, 1902.
NO MODEL. 3 SHEETS—SHEET 1.

Witnesses, Inventor,
Wallace A. Houts
Dudley Moss. By Dewey Strong & Co.
Atty.

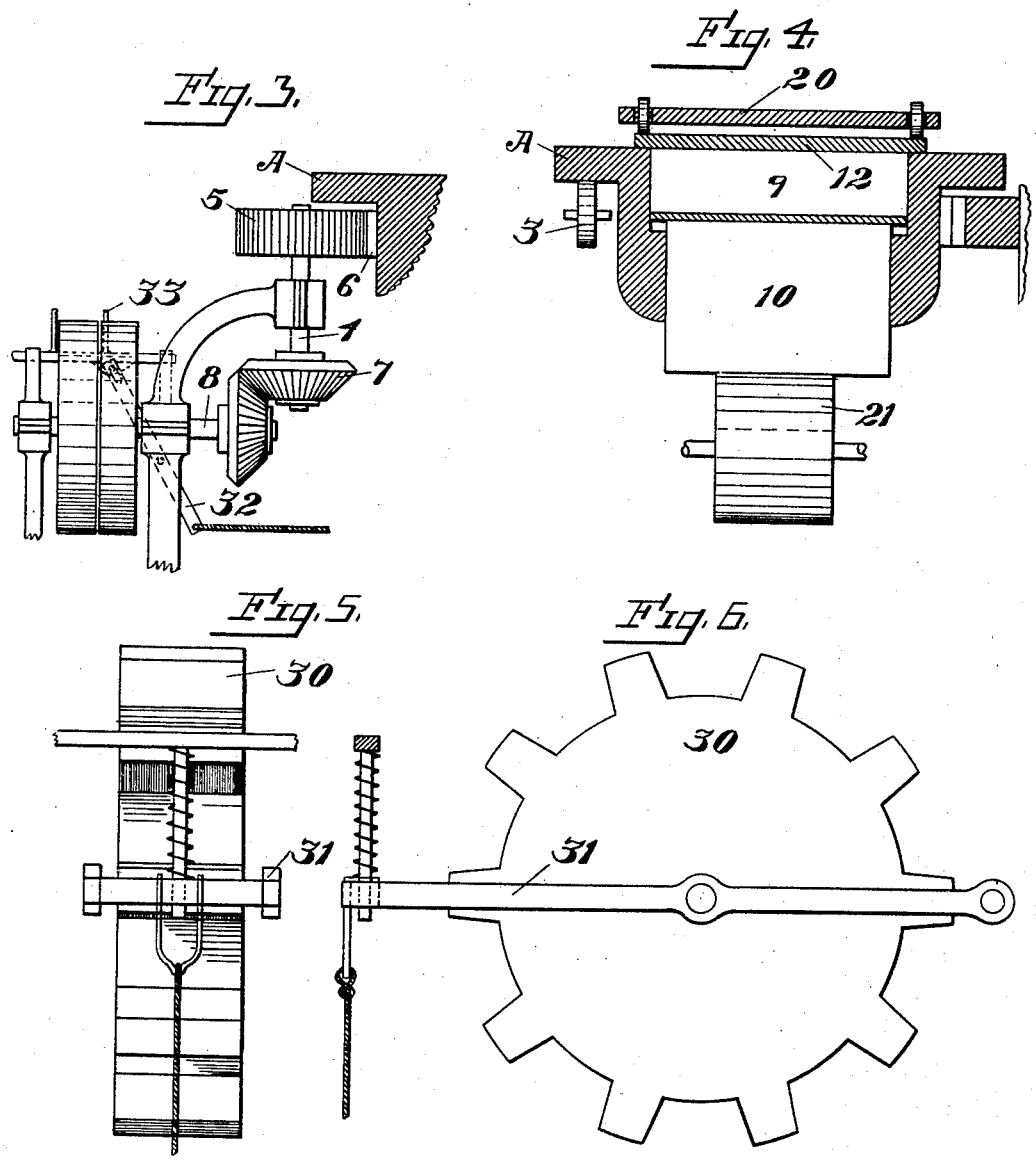

No. 737,842. PATENTED SEPT. 1, 1903.
W. A. HOUTS.
BRICK MAKING MACHINE.
APPLICATION FILED OCT. 13, 1902.
NO MODEL. 3 SHEETS—SHEET 3.
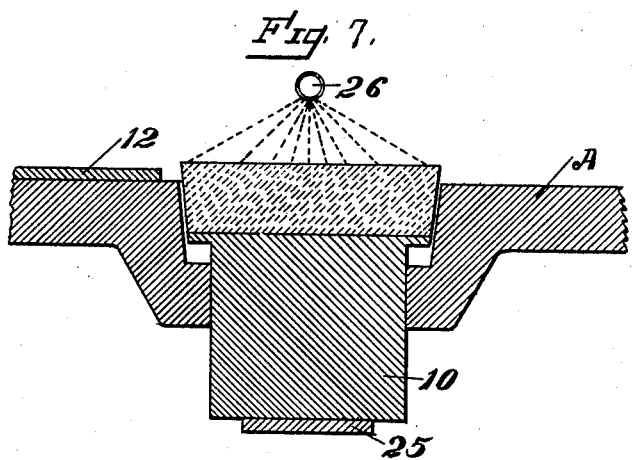
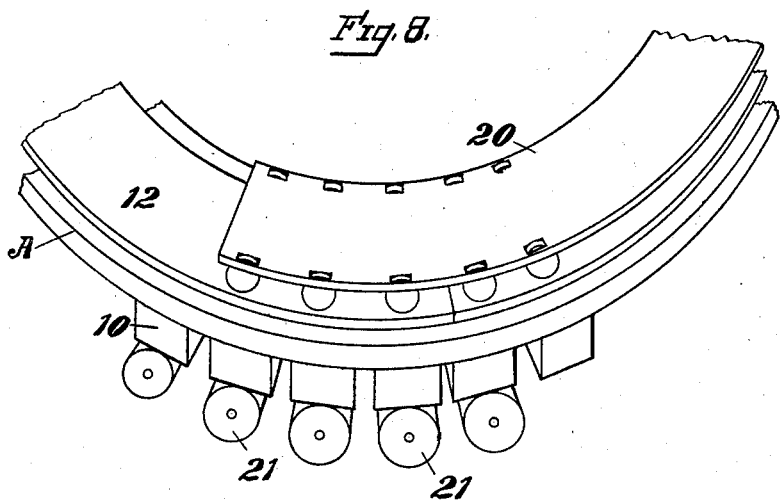

No. 737,842. Patented September 1, 1903.

UNITED STATES PATENT OFFICE.

WALLACE A. HOUTS, OF OAKLAND, CALIFORNIA.

BRICK-MAKING MACHINE.

SPECIFICATION forming part of Letters Patent No. 737,842, dated September 1, 1903.

Application filed October 13, 1902. Serial No. 127,024. (No model.)

*To all whom it may concern:*

Be it known that I, WALLACE A. HOUTS, a citizen of the United States, residing in Oakland, county of Alameda, State of California, have invented an Improvement in Brick-Making Machines; and I hereby declare the following to be a full, clear, and exact description of the same.

My invention relates to improvements in machines for pressing and molding bricks and the like. Its object is to provide a continuously-operating means for forming bricks from compositions which have the quality of becoming plastic on the application of heat and of setting into a hard cohesive mass when cooled.

It consists of the parts and the construction and combination of parts to be hereinafter more fully described, having reference to the accompanying drawings, in which—

Figure 1:
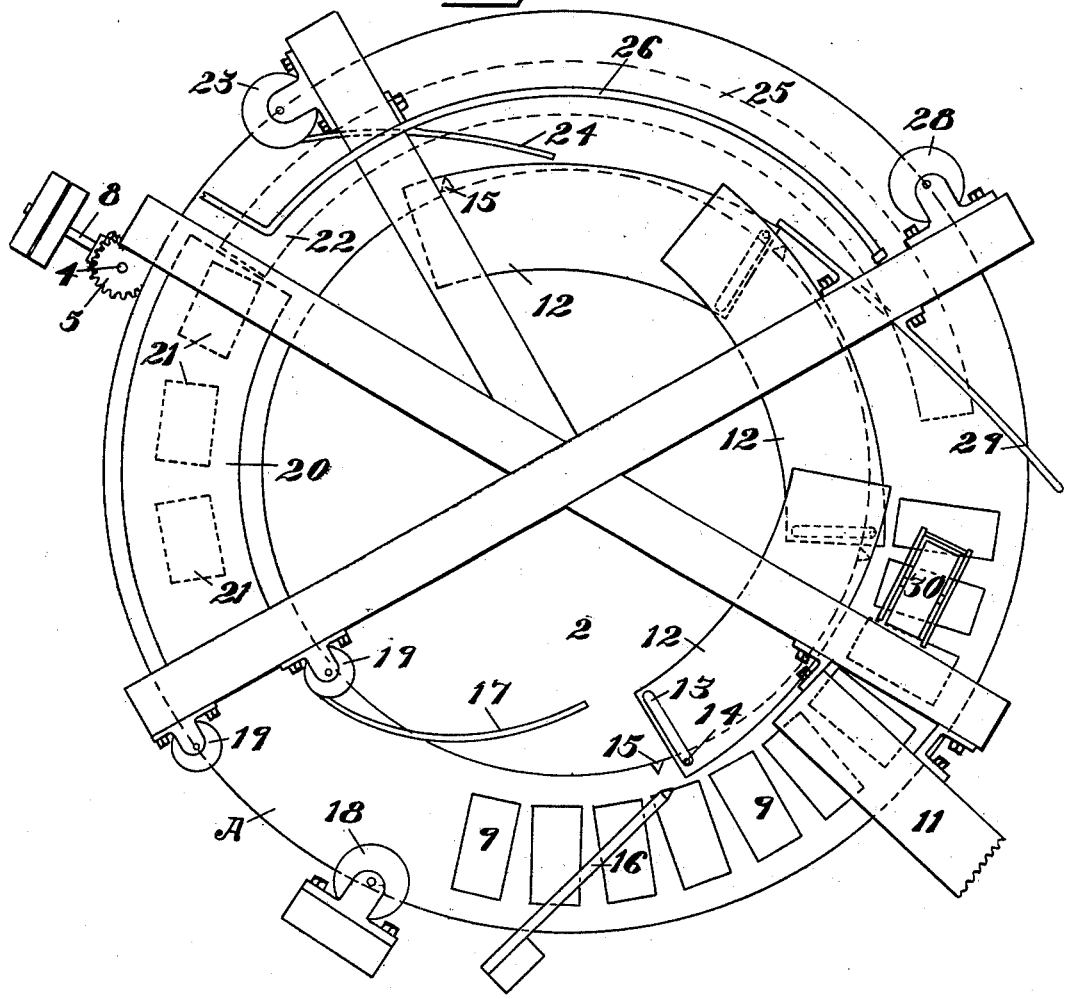
Figure 2:
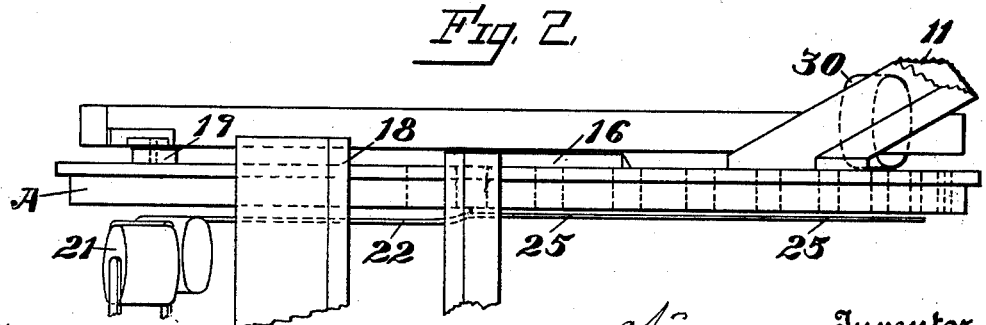

Figure 1 is a plan view of my machine. Fig. 2 is a side elevation of same. Fig. 3 shows the driving mechanism. Fig. 4 is a section through a mold. Fig. 5 is a front elevation of spur-wheel. Fig. 6 is a side elevation of same. Fig. 7 is a sectional view showing the brick lifted in the mold and showing the tapered sides of the mold, the water-pipe, and the water-spaces surrounding the sides of the brick. Fig. 8 is a plan view showing a portion of the table, the pressure-plate, and the series of rollers 21.

A represents an annular table or drum revolving about a central stationary platform-frame 2. The drum is supported upon rollers 3 and is driven from any suitable source of power. As here shown, a vertical shaft 4 has a cog-wheel 5, engaging the cogged surface 6 on the periphery of the drum. A bevel-gear 7 on the shaft 4 meshes a corresponding gear on the main power-shaft 8. At suitable intervals on the table are the radially-disposed pockets or molds 9, of shape and dimensions corresponding to the finished bricks. A plunger 10 normally rests in the bottom of each pocket and operates therein in a manner and for the purposes shortly to be set forth. The pockets are filled with material, preferably in a hot plastic condition, from a hopper 11, which has the lower edge of its throat portion in engagement with the surface of the revolving table, so that each pocket on leaving the hopper will be filled even with the top of the table. A series of radially-slidable segmental cover-plates 12 are provided upon the table, these plates being adapted to slide successively over one or more pockets and form a temporary closure for the pockets during compression of the material therein. These plates are transversely slotted at one end, as at 13, and a pin 14, near the inner edge of the table, engages in the slot. Were these plates extended over the table at one time, they would form a complete circle. In order to secure the greatest capacity for the machine, the pockets are placed as close together as is practicable. Consequently the plates 12 overlap when moved inwardly, and the wedge-shaped projections 15 on the inner edge of the table are provided, which serve to lift the back end of each plate over the slotted end of a succeeding plate.

In operation the pockets are filled as they pass beneath the hopper, and a scraper 16 acts to remove any surplus material from the surface of the table. A cover-plate adjacent to the filled pockets is engaged in the rotation of the table by a cam 17 and is moved outward over the pockets. The scraper 16 and a roller 18 are adapted to limit the movement of the plate about the pin 14 as a pivot and to guide it into position to pass between two guide-rollers 19, by which it is alined with its edges parallel with the edges of the table or drum and made squarely to cover the pockets beneath. A superposed stationary pressure-plate 20, having rollers, is then engaged by the cover-plate, whereby the latter is held down tight upon the table while the plungers are forced upward to compress the material and form the bricks. The upward reciprocation of the plungers is effected by the stems of the plungers engaging the gradually-ascending series of pressure-rollers 21. Continuous with these rollers is a guide 22, which holds the plungers up after leaving the rollers 21 until the cover-plate is moved inwardly to uncover the pockets by means of the horizontal roller 23 and guide 24. The plungers are then again gradually lifted by means of the curved inclined guide 25 until the bottom of the brick is flush with the table. The pockets are in the full-sized machine preferably made slightly tapered from top to bottom, so that when a brick is thus lifted a small space will be left around the four sides of the brick. This is to allow water from a pipe 26 to have access to as much of the surface of the brick as possible for the purpose of cooling and setting it rapidly. The slow movement of the table and the continual spraying to which the bricks are subjected after passing from beneath the pressure-plate 20 allow the bricks to have hardened, so that they can be removed without injury. A horizontal roller 28, disposed in the path of the bricks, loosens the latter from the plungers, while a guide 29 leads the bricks off into a suitable delivery-chute or conveyer. The plungers are then free to fall back into the pockets by gravity; but to insure their return into the pockets I have provided a spring-actuated spur-wheel 30, which engages in each pocket successively to press the plungers down should any of them tend to stick. In case an obstruction so great is met as to prevent the spurs on wheel 30 from forcing a plunger down, the wheel will be lifted to cause the bar 31, on which the wheel is journaled, to engage suitable means to stop the further rotation of the table. As here indicated, a lever 32, connecting with an ordinary belt-shifting mechanism 33, may be employed to stop the machine.

Having thus described my invention, what I claim, and desire to secure by Letters Patent, is—

1. The combination in a brick-making machine of a rotatable table or drum; molds in said table; means for delivering material into said molds; movable closures for the molds, said closures each having a transverse slot in one end and a pin on the table operating in said slot; plungers reciprocating in the molds to compress the material; and means for delivering the finished bricks from the molds.

2. The combination in a brick-making machine of a rotatable table or drum, molds in said drum, means for delivering material in plastic condition into said molds, closures for said pockets, pressure means engaging said closures, reciprocating plungers by which the material is compressed in the molds, a water-spraying appliance disposed above the molds, means for removing the bricks from the molds, said molds having outwardly-diverging walls whereby a water channel or space is formed about the bricks when the latter are elevated, and means engaging the plungers to insure retraction of the latter upon the delivery of the bricks.

3. The combination in a continuously-operating brick-making machine of a rotatable table or drum, molds in said drum, means for delivering material into said molds, closures for the latter including radially-slidable plates, pressure means engaging said plates to hold them down upon the table, means operating from below to compress material in the molds, means including a roller 23 and inclined guide 24 by which said plates are moved to uncover the molds, and means by which the bricks are discharged from the molds.

4. The combination in a continuously-operating brick-making machine of a rotatable table, molds therein, said molds having their walls slightly inclined from top to bottom, plungers reciprocable in said molds, means for delivering material into the molds upon the plungers, closures for the molds, means for reciprocating the plungers to compress the material, means for elevating the bricks in the tapered molds to provide a water-space about the bricks, and water-distributing appliance disposed above the molds by which the finished bricks are cooled before removal from the molds.

5. The combination in a brick-making machine of a rotatable table, molds therein, plungers reciprocable in said molds, means for delivering material into said molds, segmental plates forming closures for the molds said closures overlapping at the ends and radially movable, and having transverse slots, and pins on the table engaging said slots, means for reciprocating the plungers to compress the material, means for removing the closures, means for removing the bricks from the molds and discharging them from the table, and a spur-wheel engaging in said molds to retract the plungers.

6. The combination in a continuously-operating brick-making machine of a rotatable drum, pockets in said drum, reciprocating plungers in said pockets, means by which said plungers are actuated to compress material in said pockets to form the bricks, retracting means engaging said plungers and connections between said means and the driving means by which the operation of the machine may be automatically discontinued.

In witness whereof I have hereunto set my hand.

WALLACE A. HOUTS.

Witnesses:
S. H. NOURSE,
JESSIE C. BRODIE.